(12) United States Patent
Rodgers et al.

(10) Patent No.: US 11,077,812 B2
(45) Date of Patent: Aug. 3, 2021

(54) COMPOSITE ENERGY-ABSORBING ASSEMBLY

(71) Applicants: GM GLOBAL TECHNOLOGY OPERATIONS LLC, Detroit, MI (US); CONTINENTAL STRUCTURAL PLASTICS, INC., Auburn Hills, MI (US)

(72) Inventors: William R. Rodgers, Bloomfield Township, MI (US); Venkateshwar R. Aitharaju, Troy, MI (US); Terrence Wathen, Sterling Heights, MI (US); Yutaka Yagi, West Bloomfield, MI (US)

(73) Assignees: GM GLOBAL TECHNOLOGY OPERATIONS LLC, Detroit, MI (US); CONTINENTAL STRUCTURAL PLASTICS, INC, Auburn Hills, MI (US)

( * ) Notice: Subject to any disclaimer, the term of this patent is extended or adjusted under 35 U.S.C. 154(b) by 267 days.

(21) Appl. No.: 15/907,036

(22) Filed: Feb. 27, 2018

(65) Prior Publication Data
US 2019/0263342 A1    Aug. 29, 2019

(51) Int. Cl.
*B60R 19/18*   (2006.01)
(52) U.S. Cl.
CPC ...... *B60R 19/18* (2013.01); *B60R 2019/1893* (2013.01)
(58) Field of Classification Search
CPC .................. B60R 19/18; B60R 2019/1893
(Continued)

(56) References Cited

U.S. PATENT DOCUMENTS 5,039,567 A    8/1991 Landi et al.
5,110,653 A    5/1992 Landi
(Continued)

FOREIGN PATENT DOCUMENTS

CH          685049 A5    3/1995
CN       110194114 A     9/2019
(Continued)

OTHER PUBLICATIONS

Venkateshwar R. Aitharaju et al.; U.S. Appl. No. 15/373,639, filed Dec. 9, 2016 entitled "Cap Design for Fiber-Reinforced Composite Crush Members," 41 pages.
(Continued)

*Primary Examiner* — Joseph D. Pape
(74) *Attorney, Agent, or Firm* — Harness, Dickey & Pierce, P.L.C.

(57) ABSTRACT

An energy-absorbing assembly includes a housing and a plurality of discrete energy-absorbing elements. The housing includes a first wall and a second wall. The first wall and the second wall are spaced apart from one another to at least partially define an interior compartment. Each element of the plurality of energy-absorbing elements includes a polymer and a plurality of reinforcing fibers. The plurality of energy-absorbing elements is at least partially disposed within the interior compartment and fixed to the housing. Each energy-absorbing element of the plurality of energy-absorbing elements includes an elongated hollow structure extending between a first end and a second end. Each elongated hollow structure defines a longitudinal axis extending nonparallel to at least one of the first wall and the second wall. In various alternative aspects, each energy-absorbing element may include a transverse wall.

19 Claims, 4 Drawing Sheets

(58) Field of Classification Search
USPC .................................. 293/102, 120, 133, 132
See application file for complete search history.

(56) References Cited

U.S. PATENT DOCUMENTS

| | | | |
|---|---|---|---|
| 5,201,912 A * | 4/1993 | Terada | B60R 19/18 |
| | | | 293/120 |
| 5,306,068 A * | 4/1994 | Nakae | B60J 5/0441 |
| | | | 296/187.12 |
| 5,352,011 A | 10/1994 | Kihara et al. | |
| 5,830,548 A | 11/1998 | Andersen et al. | |
| 5,879,780 A | 3/1999 | Kindinger et al. | |
| 6,443,513 B1 * | 9/2002 | Glance | B32B 3/12 |
| | | | 293/133 |
| 7,819,462 B1 | 10/2010 | Owens | |
| 8,033,592 B2 | 10/2011 | Hsu et al. | |
| 8,109,492 B2 | 2/2012 | Winocur | |
| 8,148,455 B2 | 4/2012 | Posudievsky et al. | |
| 8,439,412 B2 | 5/2013 | Klimek | |
| 8,608,232 B2 | 12/2013 | Engertsberger et al. | |
| 8,961,724 B2 | 2/2015 | Polewarczyk et al. | |
| 9,227,673 B2 | 1/2016 | Berger et al. | |
| 9,233,657 B1 * | 1/2016 | Phadatare | B60R 19/18 |
| 9,610,983 B2 | 4/2017 | Mildner et al. | |
| 9,669,787 B2 | 6/2017 | Nishimura et al. | |
| 10,144,376 B2 | 12/2018 | Aitharaju et al. | |
| 10,269,506 B1 | 4/2019 | Tartivita | |
| 10,286,956 B2 | 5/2019 | Keuthage et al. | |
| 10,293,860 B1 | 5/2019 | Cooper et al. | |
| 10,308,201 B2 | 6/2019 | Newcomb et al. | |
| 2006/0106147 A1 | 5/2006 | Fasulo et al. | |
| 2006/0199890 A1 | 9/2006 | Fasulo et al. | |
| 2007/0299185 A1 | 12/2007 | Ottaviani et al. | |
| 2009/0250953 A1 * | 10/2009 | Perucca | B60R 19/18 |
| | | | 293/132 |
| 2010/0098925 A1 | 4/2010 | Fasulo et al. | |
| 2011/0193356 A1 | 8/2011 | Klimek | |
| 2012/0099941 A1 | 4/2012 | Larsh et al. | |
| 2012/0104803 A1 | 5/2012 | Thomas et al. | |
| 2013/0022780 A1 | 1/2013 | Kawazoe et al. | |
| 2014/0042758 A1 * | 2/2014 | Buron | B60R 19/03 |
| | | | 293/133 |
| 2014/0105703 A1 | 4/2014 | Kvilhaug et al. | |
| 2014/0319874 A1 | 10/2014 | Matsuda | |
| 2014/0339036 A1 | 11/2014 | Arai et al. | |
| 2015/0136013 A1 | 5/2015 | Preisler et al. | |
| 2016/0001816 A1 | 1/2016 | Aitharaju et al. | |
| 2016/0264082 A1 | 9/2016 | Berger et al. | |
| 2016/0356334 A1 | 12/2016 | Onoue et al. | |
| 2017/0015361 A1 | 1/2017 | Koch et al. | |
| 2017/0361794 A1 | 12/2017 | Holderreid et al. | |
| 2018/0065677 A1 | 3/2018 | Tutzer | |
| 2018/0065678 A1 | 3/2018 | Tutzer | |
| 2018/0086390 A1 | 3/2018 | Aizawa et al. | |
| 2018/0093446 A1 | 4/2018 | Ogale | |
| 2018/0099700 A1 | 4/2018 | Daigaku | |
| 2018/0186411 A1 | 7/2018 | Ast et al. | |
| 2018/0312199 A1 | 11/2018 | Kawase | |
| 2019/0077462 A1 | 3/2019 | Yang et al. | |
| 2019/0111872 A1 | 4/2019 | Newcomb et al. | |
| 2019/0232903 A1 | 8/2019 | Newcomb et al. | |
| 2019/0240892 A1 | 8/2019 | Renault | |
| 2019/0263342 A1 | 8/2019 | Rodgers et al. | |
| 2019/0264769 A1 | 8/2019 | Gergely et al. | |
| 2019/0283805 A1 | 9/2019 | Kurokawa | |
| 2019/0308669 A1 | 10/2019 | Aitharaju et al. | |

FOREIGN PATENT DOCUMENTS

| | | |
|---|---|---|
| CN | 110195757 A | 9/2019 |
| CN | 110395320 A | 11/2019 |
| DE | 102009015355 A1 | 9/2010 |
| DE | 102010030515 A1 | 12/2011 |
| DE | 102010027353 A1 | 2/2012 |
| DE | 102015207376 A1 | 10/2016 |
| DE | 102019104724 A1 | 8/2019 |
| DE | 102019104731 A1 | 8/2019 |
| DE | 102019108434 A1 | 10/2019 |
| FR | 3023250 A1 | 1/2016 |
| WO | 2014029926 A1 | 2/2014 |

OTHER PUBLICATIONS

Bradley A. Newcomb et al.; U.S. Appl. No. 15/782,307, filed Oct. 12, 2017 entitled "Fiber-Reinforced Composite Bumper Beam and Crush Members," 57 pages.

Bradley A. Newcomb et al.; U.S. Appl. No. 15/885,357, filed Jan. 31, 2018 entitled "Multi-Component Composite Energy-Absorbing Structure Having a Corrugated Joint," 53 pages.

Ryan Gergely et al.; U.S. Appl. No. 15/906,793, filed Feb. 27, 2018 entitled "Composite Energy-Absorbing Assembly Having Discrete Energy-Absorbing Elements Supported by a Carrier Plate," 76 pages.

Venkateshwar R. Aitharaju et al., U.S. Appl. No. 15/947,406, filed Apr. 6, 2018 entitled "Composite Underbody Structure for Vehicles," 67 pages.

Newcomb, Bradley A. et al., U.S. Appl. No. 16/695,855, filed Nov. 26, 2019 entitled, "Corrugated Hollow Structures and Two-Step Molding of Corrugated Hollow Structures," 52 pages.

Sabic ©, "Sabic Developing New Thermoplastic Solutions for Electric, Connected and Autonomous Vehicles", [online] Jul. 5, 2018 [retrieved on Sep. 10, 2019]. Retrieved from the Internet <URL: https://www.sabic.com/en/news/12716-sabic-developing-new-thermoplastic-solutions-for-electric-connected-and-autonomous-vehicles>.

* cited by examiner

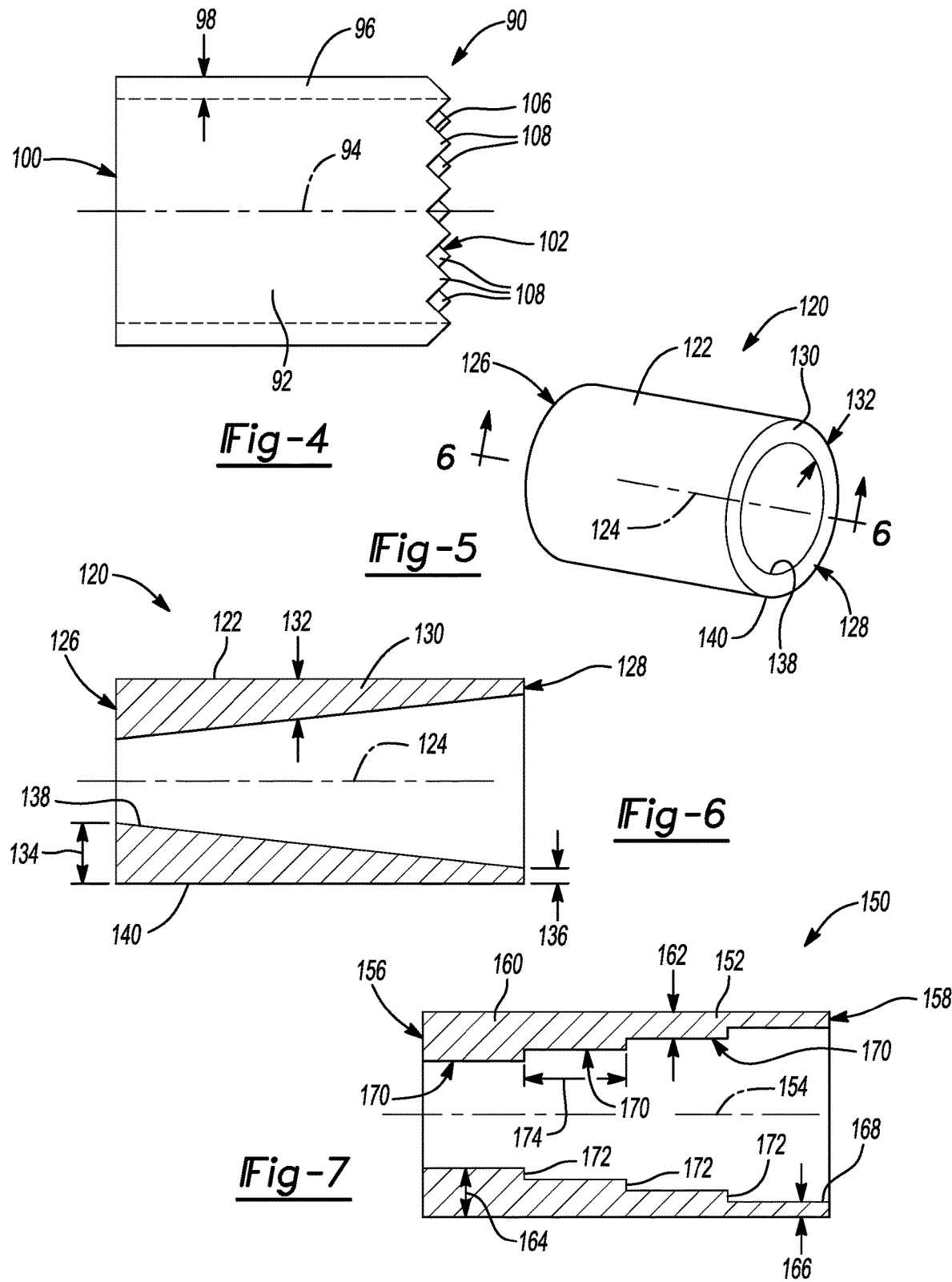

COMPOSITE ENERGY-ABSORBING ASSEMBLY

GOVERNMENT SUPPORT

This invention was made with government support under DE-EE0006826 awarded by the Department of Energy. The Government has certain rights in the invention.

INTRODUCTION

The present disclosure relates to a composite energy-absorbing assembly for a vehicle, and methods of manufacturing and assembling the composite energy-absorbing assembly.

This section provides background information related to the present disclosure which is not necessarily prior art.

It is advantageous to improve crush performance of vehicle components. However, it is also advantageous that components of automobiles or other vehicles be lightweight to improve fuel efficiency. Thus, vehicle components that exhibit both adequate strength during normal service and energy-absorption characteristics under extraordinary conditions such as collisions, while minimizing component weight are advantageous.

SUMMARY

This section provides a general summary of the disclosure, and is not a comprehensive disclosure of its full scope or all of its features.

In various aspects, the present disclosure provides an energy-absorbing assembly for a vehicle. The energy-absorbing assembly includes a housing and a first plurality of discrete energy-absorbing elements. The housing includes a first wall and a second wall. The first wall and the second wall are spaced apart from one another to at least partially define an interior compartment. Each element of the first plurality of discrete energy-absorbing elements includes a polymer and a plurality of reinforcing fibers. The first plurality of energy-absorbing elements is at least partially disposed within the interior compartment and fixed to the housing. Each energy-absorbing element of the first plurality of energy-absorbing elements includes an elongated hollow structure extending between a first end and a second end. Each elongated hollow structure defines a longitudinal axis extending nonparallel to at least one of the first wall and the second wall.

In one aspect, the respective longitudinal axes of the first plurality of energy-absorbing elements extend substantially normal to at least one of the first wall and the second wall.

In one aspect, the elongated hollow structure of each energy-absorbing element of the first plurality of energy-absorbing elements defines a substantially circular cross section in a direction perpendicular to the respective longitudinal axis.

In one aspect, the elongated hollow structure of each energy-absorbing element of the first plurality of energy-absorbing elements defines a cylinder.

In one aspect, the elongated hollow structure of each energy-absorbing element of the first plurality of energy-absorbing elements defines a conical frustum.

In one aspect, the elongated hollow structure of each energy-absorbing element of the first plurality of energy-absorbing elements defines a first diameter at the first end and a second diameter at the second end. The second diameter is less than the first diameter. The second end is disposed outward of the first end with respect to the vehicle.

In one aspect, a peripheral wall of the elongated hollow structure of each energy-absorbing element of the first plurality of energy-absorbing elements defines a thickness that varies along the longitudinal axis.

In one aspect, the peripheral wall of the elongated hollow structure of each energy-absorbing element of the first plurality of energy-absorbing elements defines a first thickness at the first end. The peripheral wall of the elongated hollow structure of each energy-absorbing element of the first plurality of energy-absorbing elements defines a second thickness at the second end. The second thickness is less than the first thickness. The second end is disposed outward of the first end with respect to the vehicle.

In one aspect, the thickness is greater than or equal to about 1 mm to less than or equal to about 5 mm.

In one aspect, the second end of each energy-absorbing element is disposed outside of the respective first end with respect to the vehicle. The second end includes a serrated surface.

In one aspect, at least one of the first end and the second end of each energy-absorbing element includes a radially-extending flange.

In one aspect, the radially-extending flange of each energy-absorbing element of the first plurality of energy-absorbing elements is disposed at the first end of the energy-absorbing element. The radially-extending flange of each energy-absorbing element is fixed to the first wall of the housing. The first end is disposed inward of the second end with respect to the vehicle. The first wall is disposed inward of the second wall with respect to the vehicle.

In one aspect, the energy-absorbing assembly further includes a second plurality of energy-absorbing elements. The second plurality of energy-absorbing elements is at least partially disposed within the interior compartment and fixed to the housing. Each of the energy-absorbing elements of the first plurality of energy-absorbing elements defines a first length in a direction parallel to the longitudinal axis. Each of the energy-absorbing elements of the second plurality of energy-absorbing elements defines a second length in the direction, the second length being distinct from the first length.

In one aspect, the energy-absorbing assembly further includes a second plurality of discrete energy-absorbing elements. The second plurality of energy-absorbing elements is at least partially disposed within the interior compartment and fixed to the housing. Each of the energy-absorbing elements of the first plurality of energy-absorbing elements defines a first diameter in a direction perpendicular to the longitudinal axis. Each of the energy-absorbing elements of the second plurality of energy-absorbing elements defines a second diameter in the direction. The second diameter is less than the first diameter. The energy-absorbing elements of the first plurality of energy-absorbing elements are arranged in a grid having rows and columns. The energy-absorbing elements of the second plurality of energy-absorbing elements are disposed between the rows and columns of the grid.

In various aspects, the present disclosure provides another energy-absorbing assembly for a vehicle. The energy-absorbing assembly includes a housing and a plurality of discrete energy-absorbing elements. The housing includes a first wall and a second wall. The first wall and the second wall are spaced apart from one another to at least partially define an interior compartment. Each energy-absorbing element of the plurality of discrete energy-absorbing elements includes a polymer and a plurality of reinforcing fibers. The plurality of energy-absorbing elements is at least partially disposed within the interior compartment and fixed to the housing. Each energy-absorbing element of the plurality of energy-absorbing elements includes a transverse wall extending between a first end and a second end.

In one aspect, the respective transverse walls of the plurality of energy-absorbing elements extend substantially normal to at least one of the first wall and the second wall.

In one aspect, the respective transverse wall of each energy-absorbing element includes a plurality of elongated ridges formed therein. Each elongate ridge of the plurality of elongated ridges is spaced apart from other elongated ridges of the plurality of elongated ridges at predetermined intervals.

In one aspect, the plurality of elongated ridges of each transverse wall of each energy-absorbing element of the plurality of energy-absorbing elements defines a periodic profile.

In one aspect, the transverse wall of each energy-absorbing element of the plurality of energy-absorbing elements defines a thickness of greater than or equal to about 1 mm to less than or equal to about 5 mm.

In various aspects, the present disclosure provides yet another energy-absorbing assembly for a vehicle. The energy-absorbing assembly includes a housing and a plurality of discrete energy-absorbing elements. The housing includes a first wall and a second wall. The first wall and the second wall are spaced apart from one another to at least partially define an interior compartment. Each energy-absorbing element of the plurality of energy-absorbing elements includes a polymer and a plurality of reinforcing fibers. The plurality of energy-absorbing elements is at least partially disposed within the interior compartment and fixed to the housing. The fibers of the plurality of reinforcing fibers have an average length of greater than about 1 mm.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a side view of yet another energy-absorbing element according to certain aspects of the present disclosure;

FIG. 5 is a perspective view of another energy-absorbing element according to certain aspects of the present disclosure;

FIG. 6 is a cross-sectional view of the energy-absorbing element of FIG. 5 taken at line 6-6 of FIG. 5;

FIG. 7 is a cross-sectional view of another energy-absorbing element according to certain aspects of the present disclosure;

Corresponding reference numerals indicate corresponding parts throughout the several views of the drawings.

DETAILED DESCRIPTION

Figure 1:
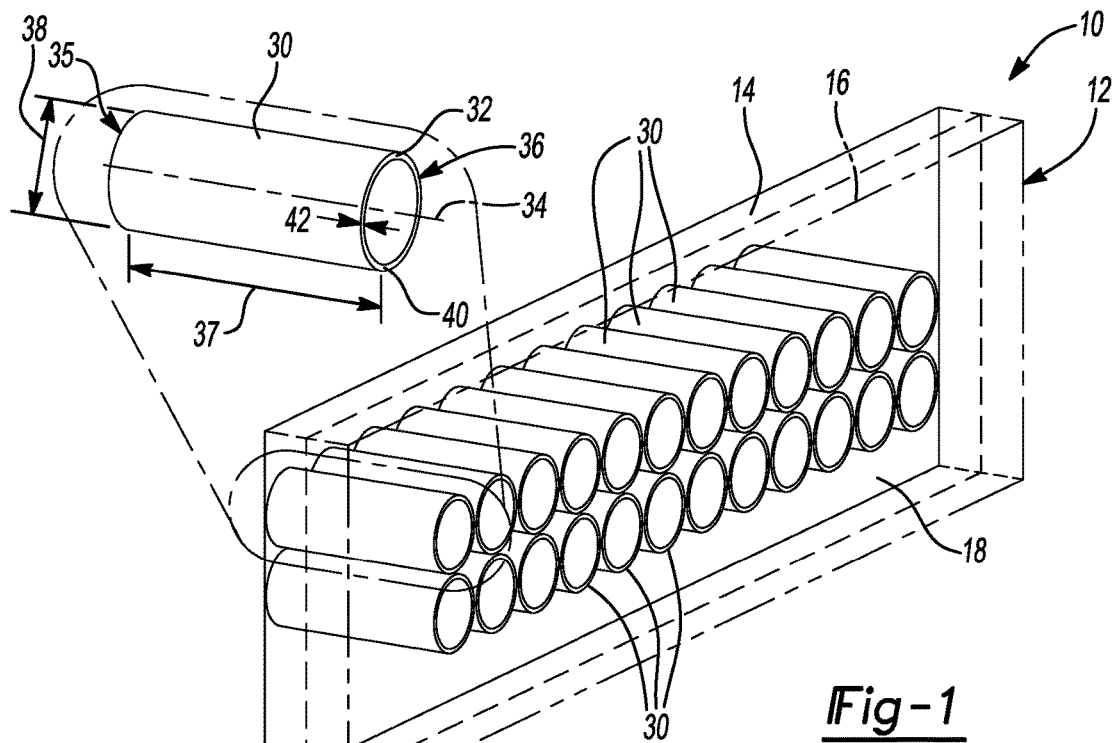
FIG. 1 is a perspective view of an energy-absorbing assembly including a plurality of discrete energy-absorbing elements according to certain aspects of the present disclosure.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

Energy-absorbing assemblies (or crush assemblies) are used in vehicles to absorb collision energy through controlled deformation. Energy-absorbing assemblies may be constructed from metal, such as aluminum or steel, or polymeric materials, such as injection molded polymers or fiber-reinforced polymeric composites. Metal crush members typically absorb energy as molecules slide past one another to deform the component without fracturing. Metal energy-absorbing assemblies may be heavy and their manufacture complicated compared to composite energy-absorbing assemblies. Metal energy-absorbing assemblies may be time-intensive to assemble because of a large quantity of components. For example, a single metal energy-absorbing assembly may include several bulkheads that are individually fabricated (e.g., by stamping) and fixed to one another (e.g., by welding).

Polymeric energy-absorbing assemblies may be formed by injection molding. As a result, existing polymeric energy-absorbing assemblies may be free of reinforcing fibers, or may include very short reinforcing fibers. For example, reinforcing fibers of existing polymeric energy-absorbing assemblies may less than 1 mm, and optionally greater than or equal to about 0.1 mm to less than or equal to about 0.4 mm. Some polymeric energy-absorbing assemblies may include an internal honeycomb structure. The honeycomb structure may include a plurality of uniformly sized, spaced, and shaped cells, with adjacent cells sharing walls. The walls may have a uniform thickness. Because of the intricate tooling required, injected-molded polymeric energy-absorbing assemblies are generally not tailored to specific vehicles or loading conditions.

Fiber-reinforced composite materials include a polymeric matrix having a reinforcing material distributed therein. Generally, fiber-reinforced composite crush members absorb energy through fragmentation, pulverization, fronding, tearing, interlaminar debonding, intralaminar debonding, fiber-matrix debonding, and fiber pullout failure modes, by way of non-limiting example. Suitable reinforcing materials include carbon fibers, glass fibers (e.g., fiber glass, quartz), basalt fibers, aramid fibers (e.g., KEVLAR®, polyphenylene benzobisoxazole (PBO)) polyethylene fibers (e.g., high-strength ultra-high molecular weight (UHMW) polyethylene), polypropylene fibers (e.g., high-strength polypropylene), natural fibers (e.g., cotton, flax, cellulose, spider silk), and combinations thereof, by way of non-limiting example. The reinforcing materials may be fabricated as woven fabric, continuous random fabric, discontinuous random fibers, chopped random fabric, continuous strand unidirectional plies, oriented chopped strand plies, braided fabric and any combinations thereof. The polymeric matrix may be a thermoplastic polymer or a thermoset polymer.

In various aspects, the present disclosure provides a composite energy-absorbing assembly. The composite energy-absorbing assembly may include a housing defining an interior compartment and multiple discrete energy-absorbing elements disposed within the interior compartment and fixed to the housing. In certain variations, the energy-absorbing elements are uniformly sized, spaced, and shaped. However, in other variations, the single energy-absorbing assembly may include energy-absorbing elements having a variety of shapes and sizes. The energy-absorbing elements may include elongated hollow structures (e.g., cylinders, conical frustums) or continuous plates (e.g., flat, corrugated, or waveform plates). The energy-absorbing elements may be uniformly distributed throughout the interior compartment, or alternatively, non-uniformly distributed throughout the interior compartment. In certain aspects, the energy-absorbing elements may be sized and shaped to initiate crush at a particular end of the energy-absorbing element. More specifically, crush may be initiated at an outermost end of the energy-absorbing element with respect to the vehicle.

With reference to FIG. 1, an energy-absorbing assembly 10 according to certain aspects of the present disclosure is provided. The energy-absorbing assembly 10 may include a housing 12. The housing 12 may include a first wall 14 and a second wall 16 (shown in skeleton). The first wall 14 may be spaced apart from the second wall 16 to at least partially define an interior compartment 18. The energy-absorbing assembly 10 may be fixed to a vehicle. For example, the housing 12 of the energy-absorbing assembly 10 may be fixed to an exterior of the vehicle.

The housing 12 may include a first component 20 including the first wall 14 and a second component 22 including the second wall 16 that are joined at a seam or joint 24. The first component 20 and the second component 22 may cooperate to at least partially define the interior compartment 18. The first and second components 20, 22 are merely exemplary, and in various alternative embodiments, the housing 12 may include other quantities of components.

The second wall 16 may be disposed outward (i.e., outboard) of the first wall 14 with respect to the vehicle. In one non-limiting example, the energy-absorbing assembly 10 may be a rocker panel or assembly or a portion of a rocker assembly. The rocker assembly can be fixed to an exterior of the vehicle and may extend along a side of the vehicle between front and rear wheel well openings. The first wall 14 of the energy-absorbing assembly may be disposed closer than the second wall 16 to a passenger cabin or center of the vehicle (i.e., a center plane extending between the front and rear of the vehicle). In another non-limiting example, the energy-absorbing assembly 10 may be a bumper beam or assembly or a portion of a bumper assembly. The bumper assembly may extend along a front of the vehicle in a cross-car direction. The first wall 14 may be closer to the rear of the vehicle than the second wall 16. The second wall 16 may be closer to the front of the vehicle than the first wall 14.

The first wall 14 may be substantially planar as shown, or the first wall 14 may alternatively be contoured, such as to complement to an exterior of the vehicle. The second wall 16 may be substantially planar as shown, or the second wall 16 may alternatively be contoured based on desired performance or appearance characteristics of the energy-absorbing assembly 10. The first wall 14 may extend substantially parallel to the second wall 16. In various alternative aspects, the first wall 14 and the second wall 16 may extend non-parallel to one another. The first and second components 20, 22 may include different or additional features, such as flanges, ribs, and additional walls, by way of non-limiting example. As referred to herein, the word "substantially," when applied to a characteristic of an element described, indicates that there may be a minor variation in the characteristic beyond what is exactly specified (for example, variation due to manufacturing tolerances) without having a substantial effect on the mechanical or physical attributes of the element.

The energy-absorbing assembly 10 may further include a plurality of discrete energy-absorbing elements 30. The energy-absorbing elements 30 may be discontinuous such that they do not share walls with one another. Because the energy-absorbing elements 30 are distinct components, the configuration and placement of energy-absorbing elements 30 can be optimized for anticipated crush or load conditions. The energy-absorbing elements 30 can be optimized by changing the size, shape, and/or distribution of energy-absorbing elements 30.

Each of the energy-absorbing elements 30 may include an elongated hollow structure 32 defining a longitudinal axis 34. The elongated hollow structure 32 may extend between a first end 35 of the energy-absorbing element 30 and a second end 36 of the energy-absorbing element 30 opposite the first end 35. The first end 35 and the second end 36 may be open. In various aspects, the energy-absorbing element 30 may be symmetric about the longitudinal axis 34.

The energy-absorbing elements 30 may be fixed to the housing 12. The energy-absorbing elements 30 may be fixed to at least one of the first wall 14 and the second wall 16. In one example, the respective first ends 35 of the energy-absorbing elements 30 are fixed to the first wall 14. The respective longitudinal axes 34 of the energy-absorbing elements 30 may extend substantially perpendicular to the first wall 14. Where the first wall 14 is contoured or curved, the longitudinal axes 34 may extend substantially normal to a tangent plane of the curve. In certain variations, the respective longitudinal axes 34 of the energy-absorbing elements 30 extend substantially parallel to one another.

The elongated hollow structure 32 may define a substantially circular cross section in a direction perpendicular to the longitudinal axis 34. The elongated hollow structure 32 may define a tube or cylinder. In other examples, the elongated hollow structure 32 may define alternative shapes, such as a conical frustum (see, e.g., energy-absorbing element 50 of FIG. 2).

Each energy-absorbing element 30 may define a length 37 in an axial direction parallel to the longitudinal axis 34. In various aspects, the length 37 may be greater than or equal to about 10 mm to less than or equal to about 200 mm, optionally greater than or equal to about 20 mm to less than or equal to about 150 mm, optionally greater than or equal to about 30 mm to less than or equal to about 125 mm, and optionally greater than or equal to about 50 mm to less than or equal to about 100 mm. Each energy-absorbing element 30 may further define a diameter 38. The diameter 38 may be an outer diameter. In various aspects, the diameter 38 may be greater than or equal to about 5 mm to less than or equal to about 100 mm, optionally greater than or equal to about 10 mm to less than or equal to about 80 mm, optionally greater than or equal to about 20 mm to less than or equal to about 60 mm, and optionally greater than or equal to about 25 mm to less than or equal to about 45 mm. Although the energy-absorbing elements 30 are shown as having similar or identical lengths 37 and diameters 38, other arrangements are contemplated (see, e.g., energy-absorbing assembly 190 of FIG. 8 and energy-absorbing assembly 220 of FIG. 9). The energy-absorbing elements 30 may have a length to diameter ratio (i.e., length 37/diameter 38) of greater than or equal to about 1 to less than or equal to about 40, and optionally greater than or equal to about 1 to less than or equal to about 10, by way of non-limiting example. The length, diameter, and length to diameter ratio ranges described above may also be applicable to other energy-absorbing elements described herein (see, e.g., FIGS. 2-9).

Each elongated hollow structure 32 includes a respective peripheral wall 40. The peripheral wall 40 may define a thickness 42. The thickness 42 may be greater than or equal to about 0.5 mm to less than or equal to about 10 mm, optionally greater than or equal to about 1 mm to less than or equal to about 10 mm, optionally greater than or equal to about 1 mm to less than or equal to about 7 mm, optionally greater than or equal to about 1 mm to less than or equal to about 5 mm, optionally greater than or equal to about 1 mm to less than or equal to about 4 mm, and optionally greater than or equal to about 1 mm to less than or equal to about 3 mm. The thickness 42 may be uniform or constant along the longitudinal axis 34. In various alternative aspects, as discussed in greater detail below, the thickness 42 may vary along the longitudinal axis (see, e.g., FIGS. 6-7).

Each of the energy-absorbing elements 30 may be formed from or include a composite including polymer and a plurality of reinforcing fibers. The polymer may be any suitable thermoplastic resin or thermoset resin. The thermoplastic resin may include: vinyl chloride resin, vinylidene chloride resin, vinyl acetate resin, polyvinyl alcohol resin, polystyrene resin, acrylonitrile styrene resin, acrylonitrile-butadiene-styrene resin, acrylic resin, methacrylate resin, polyethylene resin, polypropylene resin, polyamide resin (PA6, PA11, PA12, PA46, PA66, PA610), fully or partially aromatic polyamide resins, polyacetal resin, polycarbonate resin, polyethylene terephthalate resin, polyethylene naphthalate resin, polybutylene terephthalate resin, polyacrylate resin, polyphenylene ether resin, polyphenylene sulfide resin, polysulfone resin, polyether sulfone resin, polyether ether ketone resin, polylactide resin, or any combination or copolymer of these resins. The thermoset resin may include: benzoxazine, a bis-maleimide (BMI), a cyanate ester, an epoxy, a phenolic (PF), a polyacrylate (acrylic), a polyimide (PI), an unsaturated polyester, a polyeurethane (PUR), a vinyl ester, a siloxane, or any combination or copolymer of these resins.

The reinforcing fibers may include: carbon fibers, glass fibers (e.g., fiber glass, quartz), basalt fibers, aramid fibers (e.g., KEVLAR®, polyphenylene benzobisoxazole (PBO), polyethylene fibers (e.g., ultra-high molecular weight polyethylene (UHMWPE)), polypropylene fibers (e.g., high-strength polypropylene) natural fibers (e.g., cotton, flax, cellulose, spider silk), and combinations thereof, by way of non-limiting example. The reinforcing fibers may be fabricated as woven fabric, continuous random fabric, discontinuous random fibers, chopped random fabric, continuous strand unidirectional plies, oriented chopped strand plies, braided fabric, and combinations thereof, by way of non-limiting example. The reinforcing fibers may have an average length of greater than about 1 mm, optionally greater than about 2.5 mm, optionally greater than about 5 mm, optionally greater than or equal to 10 mm, and optionally greater than or equal to 20 mm, by way of non-limiting example. In certain variations, the reinforcing fibers may have an average length of greater than or equal to about 0.5 mm to less than or equal to about 30 mm, optionally greater than or equal to about 1 mm to less than or equal to about 25 mm, optionally greater than or equal to about 5 mm to less than or equal to about 20 mm, and optionally greater than or equal to about 10 mm to less than or equal to about 15 mm.

As appreciated by those of skill in the art, the composite material may further include other conventional ingredients, including other reinforcement materials, functional fillers or additive agents, like organic/inorganic fillers, fire-retardants, anti-ultraviolet radiation agents (UV stabilizers), anti-oxidants, colorants, mold release agents, softeners, plasticizing agents, surface active agents, and the like.

The housing 12 may be formed from or include a composite or a metal. The composite may include a polymer, such as the thermoplastic or thermoset resins described above. The metal may be aluminum or steel, by way of non-limiting example.

Figure 2:
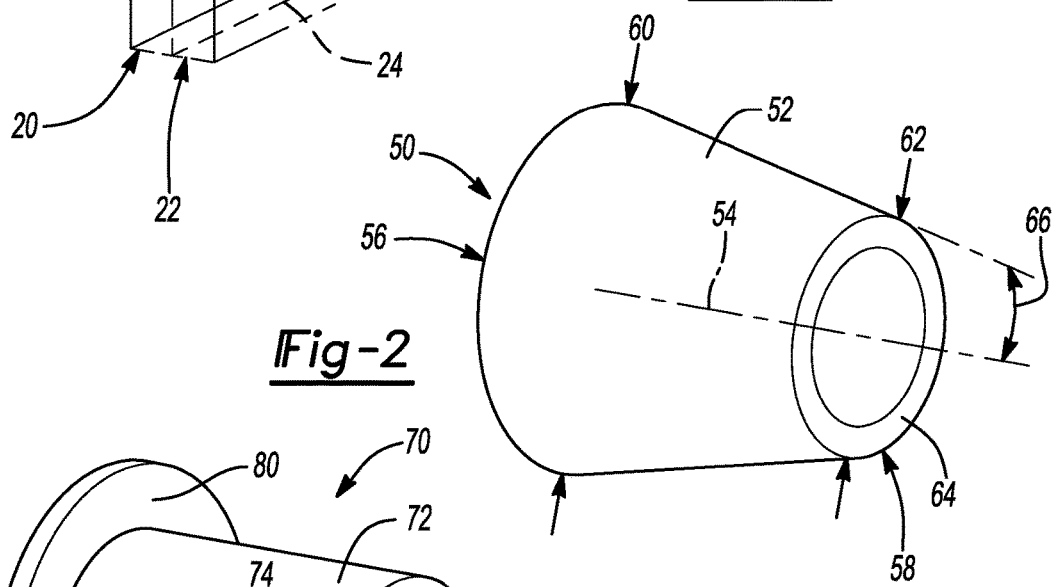
FIG. 2 is a perspective view of an energy-absorbing element according to certain aspects of the present disclosure.

Referring to FIG. 2, another energy-absorbing element 50 according to certain aspects of the present disclosure is provided. Unless otherwise described, the energy-absorbing element 50 may be similar to the energy-absorbing element 30 of FIG. 1. The energy-absorbing element 50 can be fixed to a housing similar to the housing 12 of FIG. 1. The energy-absorbing element 50 may include an elongated hollow structure 52. The elongated hollow structure 52 may define a longitudinal axis 54. The energy-absorbing element 50 may extend between a first end 56 and a second end 58. The elongated hollow structure 52 may define a circular cross section in a direction perpendicular to the longitudinal axis 54.

The elongated hollow structure 52 may define a conical frustum. Thus, the first end 56 of the energy-absorbing element 50 may define a first diameter 60 and the second end 58 of the energy-absorbing element 50 may define a second diameter 62 that is distinct from the first diameter 60. The second end 58 may be disposed outward of the first end 56 with respect to the vehicle. The second diameter 62 may be less than the first diameter 60 such that the second end 58 of the energy-absorbing element may initiate crush prior to the first end 56 upon being subjected to an impact exceeding a threshold force.

The elongated hollow structure 52 of each energy-absorbing element 50 may include a peripheral wall 64. The peripheral wall 64 may form an angle 66 with respect to the longitudinal axis 54. The angle 66 may be greater than 0° to less than or equal to about 45°, optionally greater than or equal to about 3° to less than or equal to about 30°, optionally greater than or equal to about 5° to less than or equal to about 20°, and optionally greater than or equal to about 7° to less than or equal to about 15°. The angle 66 can be optimized for non-perpendicular impacts (i.e., impacts that are non-parallel to the longitudinal axis 54 of the energy-absorbing element 50. The elongated hollow structures 52 may be symmetric about the respective longitudinal axes 54, as shown in FIG. 2 (i.e., the elongated hollow structures 52 may define right conical frustums). However, in alternative embodiments, the elongated hollow structures 52 may be asymmetric about the respective longitudinal axes 54, depending on the direction of anticipated crush conditions. In various aspects, right conical frustums may be simpler to manufacture than non-right conical frustums.

Figure 3:
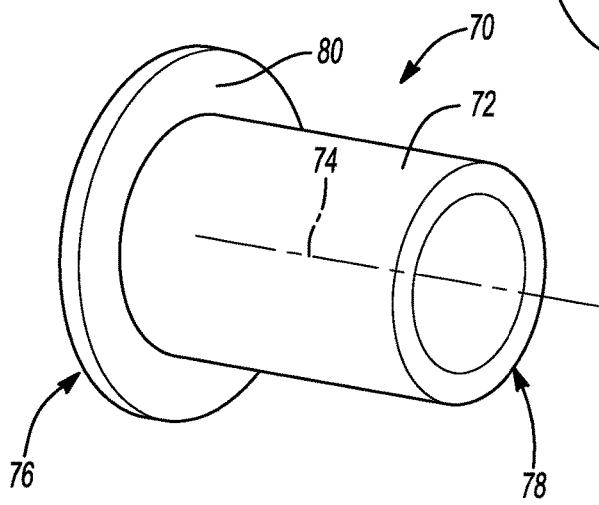
FIG. 3 is a perspective view of another energy-absorbing element according to certain aspects of the present disclosure.

With reference to FIG. 3, yet another energy-absorbing element 70 according to certain aspects of the present disclosure is provided. Unless otherwise described, the energy-absorbing element 70 may be similar to the energy-absorbing element 30 of FIG. 1. The energy-absorbing element 70 can be fixed to a housing similar to the housing 12 of FIG. 1. The energy-absorbing element 70 may include an elongated hollow structure 72 defining a longitudinal axis 74. The energy-absorbing element 70 may include a first end 76 and a second end 78 opposite the first end 76.

The first end 76 of the energy-absorbing element 70 may include a radially-outwardly-extending flange 80. The flange 80 can be used to fix the energy-absorbing element 70 to the housing (e.g., housing 12 like that shown in FIG. 1). More particularly, the flange 80 may increase surface area contact between the energy-absorbing element 70 and the housing (e.g., the first wall 14 of housing 12) to improve retention strength when the energy-absorbing element 70 is fixed to the housing. For example, when adhesive is used to fix the energy-absorbing element 70 to the housing, the increased surface area may create a stronger bond between the energy-absorbing element 70 and the housing. Although the flange 80 is shown as radially-outwardly-extending (i.e., away from the longitudinal axis 74), the flange 80 may alternatively be radially-inwardly extending (i.e., toward the longitudinal axis 74) such that it forms or is part of an end cap. In various aspects, the flange 80 and the elongated hollow structure 72 may be integrally formed. The energy-absorbing element 70 having the flange 80 disposed at the first end 76 may therefore include a unibody structure. As appreciated by those of skill in the art, a flange similar to the flange 80 may be used on any of the energy-absorbing elements discussed herein (e.g., energy-absorbing elements 30, 50, 90, 120, 150, 260, 290 of FIGS. 1, 2, 4, 5, 7, 10, 11, respectively).

Referring to FIG. 4, still another energy-absorbing element 90 according to certain aspects of the present disclosure is provided. Unless otherwise described, the energy-absorbing element 90 may be similar to the energy-absorbing element 30 of FIG. 1. The energy-absorbing element 90 may include an elongated hollow structure 92 defining a longitudinal axis 94. The elongated hollow structure 92 may include a peripheral wall 96 having a uniform thickness 98. The energy-absorbing element 90 may include a first end 100 and a second end 102, with the second end 102 being disposed outward of the first end 100 with respect to the vehicle when the energy-absorbing element is fixed to a housing. The first end 100 and the second end 102 may be open.

The second end 102 may include a crush-initiation feature, such as a serrated surface 106. The serrated surface 106 may include serrations 108 that extend in a direction parallel to the longitudinal axis 94. In certain aspects, the serrated surface 106 may define a saw tooth pattern. Thus, the second end 102 may crush or fail before the first end 100. In various alternative aspects, the crush initiation feature may include crenellations, a plurality of apertures, a plurality of slots, or perforation, by way of non-limiting example. In another alternative aspect, the crush initiation feature may include a region of polymeric resin that is substantially free of reinforcing fibers. As appreciated by those of skill in the art, the crush-initiation feature (e.g., serrated surface 106) may be included on any of the other energy-absorbing elements of the present disclosure (e.g., energy-absorbing elements 30, 50, 70, 120, 150, 260, 290 of FIGS. 1, 2, 3, 5, 7, 10, 11, respectively), and is therefore not limited to the cylindrical, uniform wall thickness embodiment shown in FIG. 4.

With reference to FIGS. 5-6, yet another energy-absorbing element 120 according to certain aspects of the present disclosure is provided. Unless otherwise described, the energy-absorbing element 120 may be similar to the energy-absorbing element 30 of FIG. 1. The energy-absorbing element 120 may include an elongated hollow structure 122 defining a longitudinal axis 124. The energy-absorbing element 120 may extend between a first end 126 and a second end 128. The second end 128 may be disposed outward of the first end 126 with respect to the vehicle when the energy-absorbing element 120 is fixed to a housing.

The elongated hollow structure 122 may include a peripheral wall 130. A thickness 132 of the peripheral wall 130 may vary along the longitudinal axis 124. The thickness 132 may be measured in a radial direction (i.e., substantially perpendicular to the longitudinal axis 124). More particularly, the peripheral wall 130 may define a first thickness 134 at the first end 126 and a second thickness 136 at the second end 128. The first thickness 134 and the second thickness 136 may be distinct. The second thickness 136 may be less than the first thickness 134. Thus, the second end 128 may initiate crush before the first end 126 crushes or fails. In certain variations, the first thickness 134 may be less than or equal to about 10 mm, optionally less than or equal to about 7 mm, optionally less than or equal to about 5 mm, and optionally less than or equal to about 3 mm. The second thickness 136 may be less than or equal to about 2 mm, optionally less than or equal to about 1.5 mm, optionally less than or equal to about 1 mm, and optionally less than or equal to about 0.5 mm. The thickness 132 may be tapered such that it gradually decreases from the first end 126 to the second end 128. The thickness 132 may decrease linearly or at a uniform rate so that an inner surface 138 of the peripheral wall 130 forms a ramp with respect to an outer surface 140 of the peripheral wall 130.

The thickness 132 may alternatively decrease from the first end 126 to the second end 128 in a non-linear manner. Referring to FIG. 7, a cross sectional view of an alternative energy-absorbing element 150 according to certain aspects of the present disclosure is provided. Unless otherwise described, the energy-absorbing element 150 may be similar to the energy-absorbing element 120 of FIGS. 5-6. The energy-absorbing element 150 may include an elongated hollow structure 152 defining a longitudinal axis 154. The energy-absorbing element 150 may extend between a first end 156 and a second end 158. The second end 158 may be disposed outward of the first end 156 with respect to the vehicle when the energy-absorbing element 150 is fixed to a housing.

The elongated hollow structure 152 may include a peripheral wall 160. A thickness 162 of the peripheral wall 160 may vary along the longitudinal axis 154. The thickness 162 may be measured in a radial direction (i.e., substantially perpendicular to the longitudinal axis 154). More particularly, the peripheral wall 160 may define a first thickness 164 at the first end 156 and a second thickness 166 at the second end 158. The first thickness 164 may be distinct from the second thickness 166. The second thickness 166 may be less than the first thickness 164. Thus, the second end 158 may initiate crush before the first end 156.

The thickness 162 may decrease by uniform steps. Thus, an inner surface 168 of the peripheral wall 160 may include rings 170 having a substantially constant diameter and radial steps 172 between the respective rings 170. In one example, the inner surface 168 includes four rings 170. However, in certain alternative variations, the inner surface 168 may include other quantities of rings 170, such as two, three, five, six, or ten, by way of non-limiting example. Moreover, although each ring 170 is shown as having a length 174 in a direction parallel to the longitudinal axis 154 that is substantially the same as other rings 170, the rings 170 may alternatively have non-uniform lengths. In one non-limiting example, an energy-absorbing element may include a peripheral wall having two rings, with a first ring closest to a first or innermost end being substantially longer than a second ring closest to a second or outermost end (not shown).

Although the energy-absorbing elements 120 (FIGS. 5-6), 150 (FIG. 7) are shown as symmetric about the respective longitudinal axes 124, 154, in various alternative embodiments, the energy-absorbing elements 120, 150 may by asymmetric about the respective longitudinal axes 124, 154. More particularly, an alternative energy-absorbing element may include discrete regions of higher or lower thickness in a peripheral wall compared to surrounding regions. Such a design may be advantageous to optimize the energy-absorbing element for particular crush conditions. Furthermore, as those skilled in the art appreciate, any of the other energy-absorbing elements of the present disclosure (e.g., energy-absorbing elements 30, 50, 70, 90, 260, 290 of FIGS. 1, 2, 3, 4, 10, 11, respectively) may include a peripheral wall defining a variable thickness.

In some variations, an energy-absorbing assembly may include a plurality of substantially identical energy-absorbing elements that are distributed uniformly within a housing (see, e.g., energy-absorbing assembly 10 of FIG. 1). However, in other variations, an energy-absorbing assembly may include two or more distinct or different types of energy-absorbing elements. Distinct energy-absorbing elements may have different shapes (e.g., cylindrical, frusto-conical), sizes (e.g., length, diameter, thickness, change in thickness, angle of peripheral wall with respect to longitudinal axis), features (e.g., flange), and/or materials of construction (e.g., polymer and/or reinforcing fiber) by way of non-limiting example. The energy-absorbing assembly may also include energy-absorbing elements that are non-uniformly distributed. For example, the energy-absorbing assembly may include regions of relatively higher and relatively lower density of energy-absorbing assemblies. Moreover, distinct types of energy-absorbing elements may be grouped together (e.g., a region of frusto-conical energy-absorbing elements surrounded by cylindrical energy-absorbing elements), or distributed throughout an interior compartment of the housing (e.g., frusto-conical and cylindrical energy-absorbing elements uniformly or non-uniformly distributed throughout an interior compartment).

The energy-absorbing elements may be distributed so that a peripheral wall of one energy-absorbing element is in contact with respective peripheral walls of adjacent energy-absorbing elements. Alternatively, the energy-absorbing elements may be distributed so that peripheral walls of respective energy-absorbing elements are spaced apart from one another (i.e., not in direct contact with one another). Furthermore, the arrangement of the energy-absorbing elements with respect to one another is not limited to the arrangements shown and described herein. By way of non-limiting example, energy-absorbing elements can be distributed: (1) with the respective longitudinal axes are aligned in both first or horizontal directions and second or vertical directions (see, e.g., FIG. 1); (2) nested, so that the energy-absorbing elements are as close as possible to one another; or (3) mixed, sporadic, or random, depending on the expected crush or load conditions.

While two variations are described below (i.e., variable length in FIG. 8 and variable diameter in FIG. 9), those skilled in the art would appreciate that an energy-absorbing assembly according to certain aspects of the present disclosure may include any combination of features and arrangements described herein. Thus, the energy-absorbing assembly is not limited to the particular combinations of features described.

Figure 8:
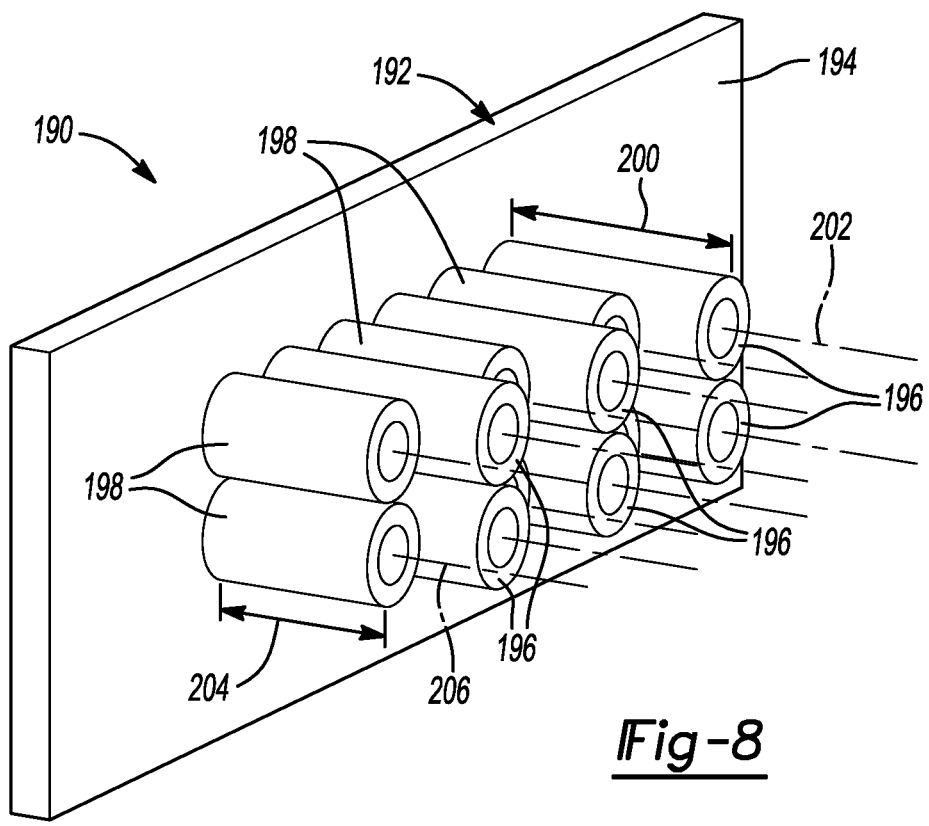
FIG. 8 is a partial perspective view of another energy-absorbing assembly according to certain aspects of the present disclosure.

With reference to FIG. 8, a portion of an energy-absorbing assembly 190 according to certain aspects of the present disclosure is provided. The energy-absorbing assembly 190 may include a housing 192, similar to the housing 12 of FIG. 1. The housing 192 may include a first wall 194. The housing 192 may further include other components that are not shown. The energy-absorbing assembly 190 may include a first plurality of energy-absorbing elements 196 and a second plurality of energy-absorbing elements 198. The energy-absorbing elements of the first and second pluralities of energy-absorbing elements 196, 198 may include features similar to any of the energy-absorbing elements of the present disclosure (e.g., energy-absorbing elements 30, 50, 70, 90, 120, 150, 260, 290 of FIGS. 1, 2, 3, 4, 5, 7, 10, 11, respectively).

The energy-absorbing elements 196 of the first plurality of energy-absorbing elements may define a first length 200 in a direction substantially parallel to respective first longitudinal axes 202. The energy-absorbing elements 198 of the second plurality of energy-absorbing elements may define a second length 204 in a direction substantially parallel to respective second longitudinal axes 206. The first length 200 may be distinct from the second length 204. For example, the first length 200 may be greater than the second length 204. In various aspects, it may be advantageous to include energy-absorbing elements 196, 198 having different lengths 200, 204 to tailor the energy-absorbing assembly 190 to particular loading conditions and/or to optimize a balance between weight and crush performance (e.g., inclusion of the second plurality of energy-absorbing elements 198 having the shorter second length 204 may decrease both the weight and the crush performance of the energy-absorbing assembly 190).

While the energy-absorbing elements of the first and second pluralities of energy-absorbing elements 196, 198 are shown as being group in pairs and the pairs intermixed, they may alternatively be arranged in other manners. In one non-limiting example, the energy-absorbing elements 196 of the first plurality of energy-absorbing elements may be grouped together in an area of relatively high expected load (not shown). In another non-limiting example, the energy-absorbing elements of the first and second pluralities of energy-absorbing elements 196, 198 may be more thoroughly intermixed such that each energy-absorbing element 198 of the second plurality of energy-absorbing elements is surrounded by energy-absorbing elements 196 of the first plurality of energy-absorbing elements, such as where the balance between weight and crush performance is optimized (not shown). The energy-absorbing assembly 190 may include other quantities of pluralities of energy-absorbing elements having different lengths.

Figure 9:
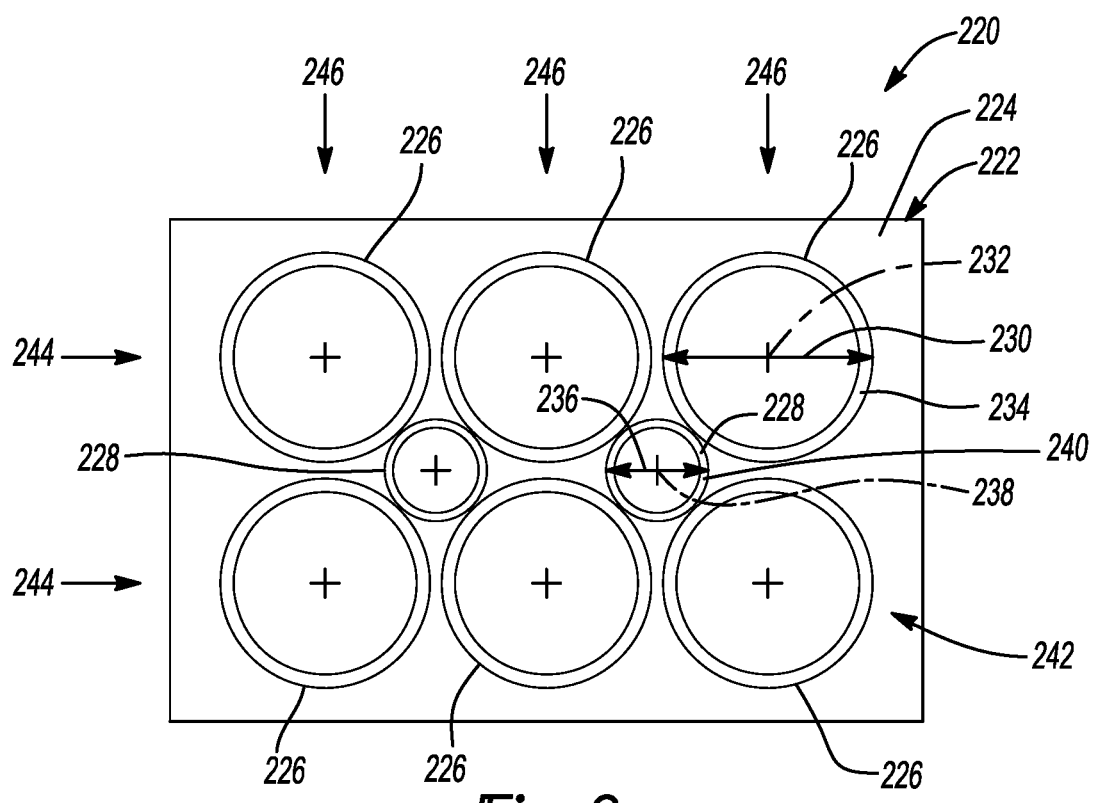
FIG. 9 is a partial front view of another energy-absorbing assembly according to certain aspects of the present disclosure.

Referring to FIG. 9, a portion of another energy-absorbing assembly 220 according to certain aspects of the present disclosure is provided. The energy-absorbing assembly 220 may include a housing 222, similar to the housing 12 of FIG. 1. The housing 222 may include a first wall 224. The housing 222 may further include other components that are not shown. The energy-absorbing assembly 220 may include a first plurality of energy-absorbing elements 226 and a second plurality of energy-absorbing elements 228. The energy-absorbing elements of the first and second pluralities of energy-absorbing elements 226, 228 may include features similar to any of the energy-absorbing elements of the present disclosure (e.g., energy-absorbing elements 30, 50, 70, 90, 120, 150, 260, 290 of FIGS. 1, 2, 3, 4, 5, 7, 10, 11, respectively).

The energy-absorbing elements 226 of the first plurality of energy-absorbing elements may have respective first diameters 230 in a direction substantially parallel to respective first longitudinal axes 232. The first diameters 230 may be respective first outer diameters of respective first peripheral walls 234 of respective first elongated hollow structures. The energy-absorbing elements 228 of the second plurality of energy-absorbing elements may have respective second diameters 236 in a direction substantially parallel to respective second longitudinal axes 238. The second diameters 236 may be second outer diameters of respective second peripheral walls 240 of respective second elongated hollow structures. The first diameter 230 and the second diameter 236 may be distinct. The second diameter 236 may be less than the first diameter 230.

The energy-absorbing elements 228 of the second plurality of energy-absorbing elements may be nested between the energy-absorbing elements 226 of the first plurality of energy-absorbing elements. Each energy-absorbing element 228 of the second plurality of energy-absorbing elements may be surrounded by four energy-absorbing elements 226 of the first plurality of energy-absorbing elements. More specifically, the energy-absorbing elements 226 of the first plurality of energy-absorbing elements may be disposed in a grid 242 having rows 244 and columns 246. The energy-absorbing elements 228 of the second plurality of energy-absorbing elements may be disposed between the rows 244 and the columns 246.

Such an arrangement of energy-absorbing elements 226, 228 may maximize a quantity of energy-absorbing elements in a given volume (i.e., increase a density of energy-absorbing elements). Where energy-absorbing elements are closer to one another (i.e., present in higher densities within a given volume), crush performance of the energy absorbing assembly 220 may increase. In various aspects, the arrangement of energy-absorbing elements 226, 228 of the energy-absorbing assembly 220 may be referred to as a "space-filling arrangement." In various alternative aspects, the energy-absorbing assembly 220 may further include additional pluralities of energy-absorbing elements of decreasing diameter disposed interstitially with respect to larger-diameter energy-absorbing elements.

Figure 10:
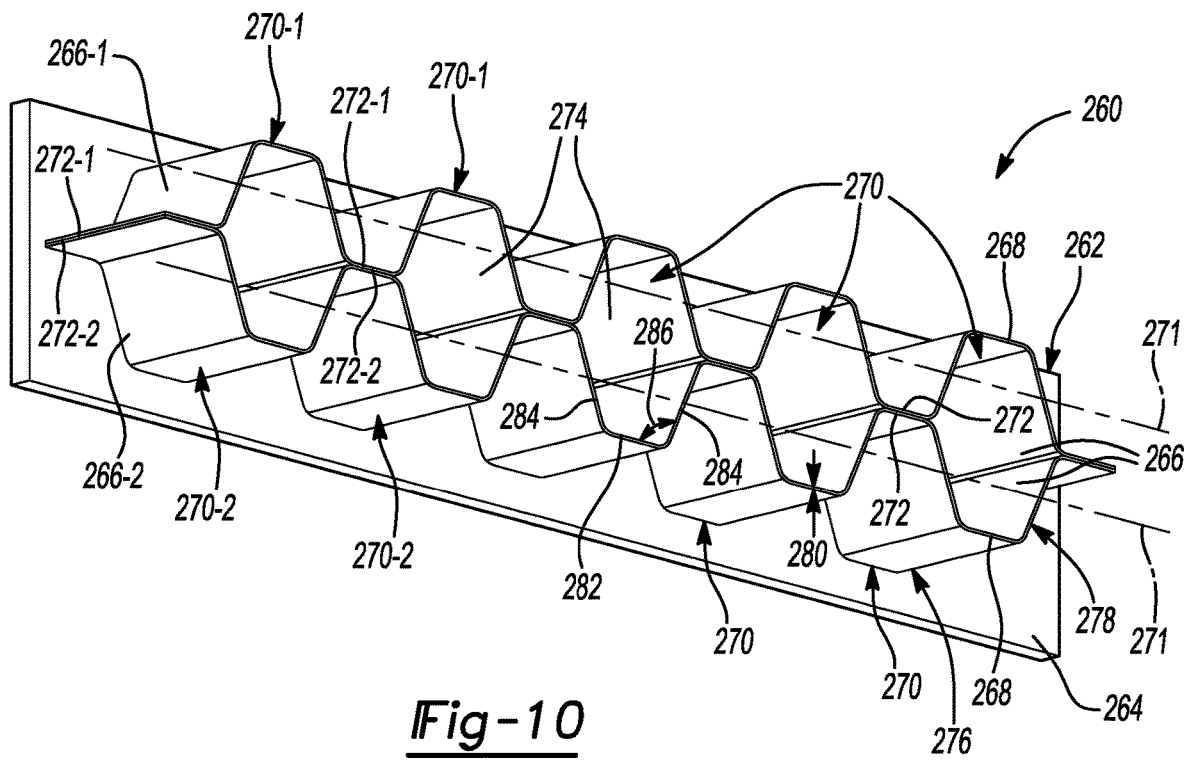
FIG. 10 is a partial perspective view of yet another energy-absorbing assembly according to certain aspects of the present disclosure.

With reference to FIG. 10, a portion of another energy-absorbing assembly 260 according to certain aspects of the present disclosure is provided. The energy-absorbing assembly 260 may include a housing 262 having a first wall 264. Although only the first wall 264 is shown, the housing 262 may be similar to the housing 12 of FIG. 1. The energy-absorbing assembly 260 may include a plurality of energy-absorbing elements 266. Each energy-absorbing element 266 may be formed from or include a polymer and a plurality of reinforcing fibers, similar to those described with respect to the energy-absorbing elements 30 of the energy-absorbing assembly 10 of FIG. 1.

Each energy-absorbing element 266 may include a transverse wall 268 that extends across at least a portion of the housing 262. In various aspects, the respective transverse walls 266 may extend through an interior compartment of the housing 262. The transverse wall 268 of each respective energy-absorbing element 266 may include a center plane 271. The center plane 271 of the transverse wall 268 may extend substantially normal to the first wall 264. In various aspects, the energy-absorbing assembly 260 may be fixed to a vehicle operable to travel along a ground. The center plane 271 of the transverse wall 268 may extend substantially parallel to the ground.

The transverse wall 268 of each energy-absorbing element 266 may define a plurality of elongated ridges or peaks 270. Each elongate ridge 270 of the plurality of elongated ridges may be spaced apart from other elongated ridges 270 of the plurality of elongated ridges at predetermined intervals. The transverse wall 268 of each of the energy-absorbing elements 266 may define a corrugated structure. Each elongate ridge 270 may extend substantially perpendicular to the first wall 264. A plurality of elongate floors or valleys 272 may be disposed between the plurality of elongated ridges 270 such that the elongated ridges 270 and the elongate floors 272 alternate with one another. In various aspects, the elongated ridges 270 and the elongate floors 272 may define a waveform shape. The plurality of elongated ridges 207 may define a periodic profile. However, in various alternative aspects, the elongated ridges 270 may repeat at irregular intervals.

Orientations of adjacent energy-absorbing elements 260 may be mirrored so that elongate cells 274 are formed between two energy-absorbing elements 266. More particularly a first energy-absorbing element 266-1 of the plurality of energy-absorbing elements may include first elongated ridges 270-1 and first elongate floors 272-1. A second energy-absorbing assembly 266-2 may include second elongated ridges 270-2 and second elongate floors 272-2. The first elongated ridges 270-1 of the first energy-absorbing element 266-1 may be aligned with the second elongate floors 272-2 of the second energy-absorbing element 266-2 to define the elongate cells 274. Similarly, the first elongate floors 272-1 of the first energy-absorbing element 266-1 may be aligned with the second elongated ridges 270-2 of the second energy-absorbing element 266-2. The first elongate floors 272-1 may engage the second elongated ridges 270-2.

Each energy-absorbing element 266 may extend between a first end 276 and a second end 278. The second end 278 may be disposed outward of the first end 276 with respect to the vehicle. The transverse wall 268 of each energy-absorbing element 266 may define a thickness 280. The thickness 280 may be uniform as shown in FIG. 10. In various alternative aspects, the thickness 280 may vary between the first end 276 and the second end 278. More particularly, a first thickness at the first end 276 may be greater than a second thickness at the second end 278 to facilitate crush or failure initiation at the second end 278 prior to the first end 276. In various aspects, a length of the transverse wall 268 of each energy-absorbing element 266 in a direction parallel to the center plane 271 may be similar to the length 37 of the energy-absorbing element 30 of FIG. 1. A thickness of the transverse wall 268 of each energy-absorbing element 266 may be similar to the thickness 42 of the peripheral wall 40 of the energy-absorbing element 30 of FIG. 1.

Each elongate ridge 270 may include a top wall 282 and two side walls 284 to form a partially trapezoidal cross section. An angle 286 may be defined between each top wall 282 and the respective side walls 284. By way of non-limiting example, the angle 286 may be greater than or equal to about 90° (i.e., defining a partially rectangular cross section) and less than about 180°, optionally greater than or equal to about 100° to less than or equal to about 150°, and optionally greater than or equal to about 120° to less than or equal to about 135°.

Figure 11:
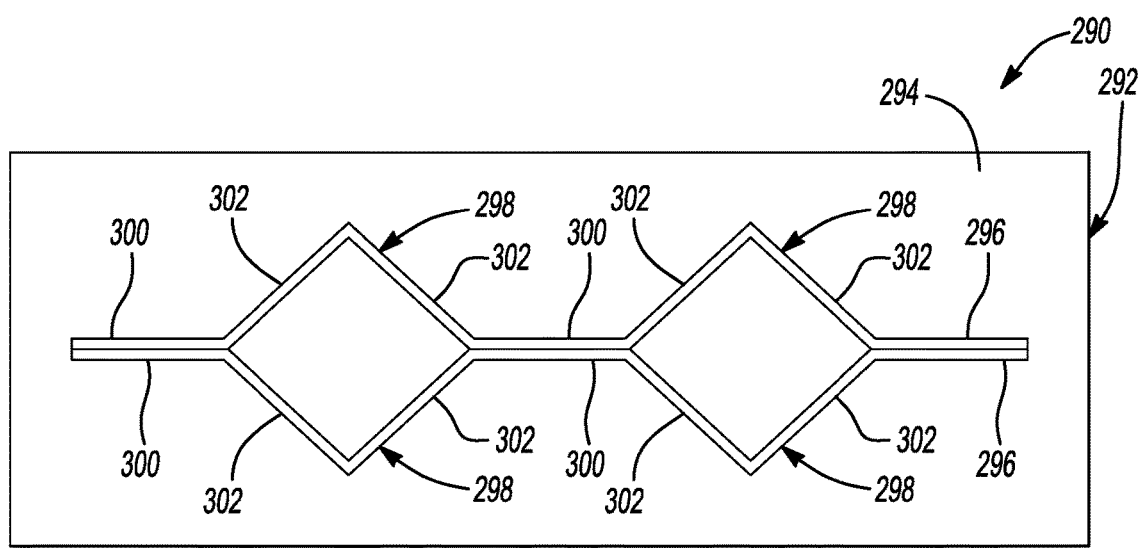
FIG. 11 is a partial front view of another energy-absorbing assembly according to certain aspects of the present disclosure.

The elongated ridges may alternatively define other shapes. Referring to FIG. 11, a portion of another energy-absorbing assembly 290 according to various aspects of the present disclosure is provided. Unless otherwise described, the energy-absorbing assembly 290 may be similar to the energy-absorbing assembly 260 of FIG. 10. Thus, the energy-absorbing assembly 290 may include a housing 292 having a first wall 294. The energy-absorbing assembly 290 may also include a plurality of energy-absorbing elements 296. The energy-absorbing elements 296 may include a plurality of elongated ridges 298 and a plurality of elongate floors 300. The elongated ridges 298 may include opposing side walls 302 to define a partially-triangular cross section. An overall cross-sectional shape may be a quadrilateral shape, such as a rhombus or diamond-like shape.

As appreciated by those skilled in the art, transverse walls of an energy-absorbing element can define alternate or additional geometries beyond what is shown in FIGS. 10-11.

As non-limiting examples, the transverse wall may define a flat plate or a smooth waveform (e.g., a sine wave). The transverse walls may alternatively omit the elongated ridges and elongate floors altogether to define a substantially planar geometry. The energy-absorbing elements of the plurality may also be differently arranged within the housing. For example, the energy-absorbing element may be disposed so that the elongated ridges are aligned with the respective elongated ridges of other energy-absorbing elements of the plurality. Moreover, the energy-absorbing elements may be spaced apart or nested to build thickness. The energy-absorbing elements may include different or additional features, such as a flange for mounting the energy-absorbing element to the housing.

The energy-absorbing assemblies described herein may be selected from the group consisting of: a rocker, a bumper beam, A, B, C, or D pillars, header rails, roof rails, front and rear rail extensions, hollow cross-car beams, and combinations thereof. Although automotive applications are discussed, the energy-absorbing assemblies may also be used in other applications such as other vehicle applications (e.g., motorcycles and recreational vehicles), in the aerospace industry (e.g., airplanes, helicopters, drones), nautical applications (e.g., ships, personal watercraft, docks), agricultural equipment, industrial equipment, and the like.

In various aspects, the present disclosure provides a method of manufacturing assembling an energy-absorbing assembly (e.g., energy-absorbing assembly 10 of FIG. 1, energy-absorbing assembly 190 of FIG. 8, energy-absorbing assembly 220 of FIG. 9, energy-absorbing assembly 260 of FIG. 10, energy-absorbing assembly 290 of FIG. 11). The method may generally include: (1) forming the energy-absorbing elements; (2) temporarily or reversibly attaching the energy-absorbing elements to one another to form an energy-absorbing subassembly; and (3) fixing the energy-absorbing subassembly within a housing to form the energy-absorbing assembly.

The forming the energy-absorbing elements may include compression molding, resin transfer mold (RTM), high-pressure resin transfer molding (HP-RTM), vacuum assisted resin transfer molding (VARTM), vacuum assisted resin infusion (VARI), injection molding, wet layup molding, autoclave molding, or any other suitable composites manufacturing method known to those skilled in the art. The energy-absorbing elements may be formed by compression molding when the polymer is a thermoplastic polymer or a thermoset polymer. The energy-absorbing elements may be formed by RTM when the polymer is a thermoset polymer.

The temporarily or reversibly attaching the energy-absorbing elements to one another to form the energy-absorbing subassembly may include shrink-wrapping the energy-absorbing elements to one another, by way of non-limiting example. The energy-absorbing elements may be temporarily attached to one another at similar spacing as the desired arrangement of the energy-absorbing elements within the housing. Temporary spacers or a fixture may be used during this step to facilitate proper spacing and alignment of the energy-absorbing elements.

The fixing the energy-absorbing elements to the housing to form the energy-absorbing assembly may include fixing the energy-absorbing elements to at least one of a first wall and a second wall. The energy-absorbing elements may optionally be fixed to the first wall. Fixing the energy-absorbing elements to the housing may include disposing a layer of adhesive between a surface of a first end or flange of each energy-absorbing element and the first wall. The adhesive may include adhesives based on methacrylate resins, urethane resins, or epoxy resins, by way of non-limiting example. Additionally or alternatively, the energy-absorbing elements may be fixed to the first wall using mechanical fasteners.

The first step (i.e., forming the energy-absorbing elements) or the first and second steps (i.e., forming the energy absorbing elements and attaching the energy-absorbing elements to one another) may advantageously be performed at a remote facility. For example, the energy-absorbing elements may be formed, bundled, and shipped to a different location for assembly to the housing and ultimately a vehicle. The above method may be performed at a relatively high speed compared to existing methods for manufacturing and assembling energy-absorbing assemblies. As such, the method may be particularly suitable for high-volume production. Furthermore, because each of the energy-absorbing elements is individually formed prior to being fixed to the housing, energy-absorbing assemblies can readily be tailored or optimized for different vehicle needs or expected load conditions.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An energy-absorbing assembly for a vehicle comprising:
   a housing comprising a first wall and a second wall, the first wall and the second wall being spaced apart from one another to at least partially define an interior compartment; and
   a plurality of discrete energy-absorbing elements each comprising a polymer and a plurality of reinforcing fibers, the plurality of energy-absorbing elements being at least partially disposed within the interior compartment and independently and directly fixed to the housing, each energy-absorbing element of the plurality of energy-absorbing elements comprising an elongated hollow structure extending between a first end and a second end and defining a substantially circular cross section in a direction perpendicular to the respective longitudinal axis, the elongated hollow structure defining a longitudinal axis extending nonparallel to at least one of the first wall and the second wall, the plurality of discrete energy-absorbing elements including,
   a first portion of the plurality of discrete energy-absorbing elements, each energy-absorbing element of the first portion defining a first length in a direction parallel to the longitudinal axis; and
   a second portion of the discrete plurality of energy absorbing elements, each of energy-absorbing element of the second portion defining a second length in the direction, the second length being distinct from the first length.

2. The energy-absorbing assembly of claim 1, wherein the respective longitudinal axes of the plurality of energy-absorbing elements extend substantially normal to at least one of the first wall and the second wall.

3. The energy-absorbing assembly of claim 1, wherein the elongated hollow structure of each energy-absorbing element of the plurality of energy-absorbing elements defines a cylinder.

4. The energy-absorbing assembly of claim 1, wherein the elongated hollow structure of each energy-absorbing element of the plurality of energy-absorbing elements defines a conical frustum.

5. The energy-absorbing assembly of claim 4, wherein the elongated hollow structure of each energy-absorbing element of the plurality of energy-absorbing elements defines a first diameter at the first end and a second diameter at the second end, the second diameter being less than the first diameter, and the second end being disposed outward of the first end with respect to the vehicle.

6. The energy-absorbing assembly of claim 1, wherein a peripheral wall of the elongated hollow structure of each energy-absorbing element of the plurality of energy-absorbing elements defines a thickness that varies along the longitudinal axis.

7. The energy-absorbing assembly of claim 6, wherein:
the peripheral wall of the elongated hollow structure of each energy-absorbing element of the plurality of energy-absorbing elements defines a first thickness at the first end; and
the peripheral wall of the elongated hollow structure of each energy-absorbing element of the plurality of energy-absorbing elements defines a second thickness at the second end, the second thickness being less than the first thickness, and the second end being disposed outward of the first end with respect to the vehicle.

8. The energy-absorbing assembly of claim 6, wherein the thickness is greater than or equal to about 1 mm to less than or equal to about 5 mm.

9. The energy-absorbing element of claim 1, wherein the second end of each energy-absorbing element is disposed outside of the respective first end with respect to the vehicle, and the second end includes a serrated surface.

10. The energy-absorbing element of claim 1, wherein at least one of the first end and the second end of each energy-absorbing element includes a radially-extending flange.

11. The energy-absorbing element of claim 10, wherein the radially-extending flange of each energy-absorbing element of the plurality of energy-absorbing elements is disposed at the first end and fixed to the first wall of the housing, the first end being disposed inward of the second end with respect to the vehicle, and the first wall being disposed inward of the second wall with respect to the vehicle.

12. The energy-absorbing assembly of claim 1, wherein:
each of the energy-absorbing elements of the first portion of energy-absorbing elements defines a first diameter in a direction perpendicular to the longitudinal axis; and
each of the energy-absorbing elements of the second portion of energy-absorbing elements defines a second diameter in the direction, the second diameter being less than the first diameter.

13. An energy-absorbing assembly for a vehicle comprising:
a housing comprising a first wall and a second wall, the first wall and the second wall being spaced apart from one another to at least partially define an interior compartment; and
a plurality of discrete energy-absorbing elements each comprising a polymer and a plurality of reinforcing fibers, the plurality of energy-absorbing elements being at least partially disposed within the interior compartment and independently and directly fixed to the housing, the plurality of reinforcing fibers having an average length of greater than about 1 mm. the plurality of discrete energy-absorbing elements including,
a first portion of the plurality of discrete energy-absorbing elements, each energy-absorbing element of the first portion defining a first length; and
a second portion of the discrete plurality of energy absorbing elements, each of energy-absorbing element of the second portion defining a second length, the second length being distinct from the first length.

14. The energy-absorbing assembly of claim 1, wherein the housing comprises another polymer and another plurality of reinforcing fibers.

15. The energy-absorbing assembly of claim 1, wherein each energy-absorbing element of the plurality of energy-absorbing elements is spaced apart from each other energy-absorbing element of the plurality of energy-absorbing elements.

16. The energy-absorbing assembly of claim 1, wherein the first length and the second length are each greater than or equal to about 30 mm to less than or equal to about 125 mm.

17. The energy-absorbing assembly of claim 16, wherein the first length and the second length are each greater than or equal to 50 mm to less than or equal to about 100 mm.

18. The energy-absorbing assembly of claim 12, wherein the first diameter and the second diameter are each greater than or equal to about 5 mm to less than or equal to about 100 mm.

19. The energy-absorbing assembly of claim 12, wherein:
the energy-absorbing elements of the first portion of the plurality of discrete energy-absorbing elements are arranged in a grid having rows and columns; and
the energy-absorbing elements of the second portion of the plurality of discrete energy-absorbing elements are disposed between the rows and columns of the grid.

* * * * *